United States Patent [19]

Goodwin, III

[11] Patent Number: 5,663,963
[45] Date of Patent: Sep. 2, 1997

[54] METHOD FOR DETECTING AND REPORTING FAILURES IN EPL SYSTEMS

[75] Inventor: John C. Goodwin, III, Suwanee, Ga.

[73] Assignee: NCR Corporation, Dayton, Ohio

[21] Appl. No.: 503,144

[22] Filed: Jul. 17, 1995

[51] Int. Cl.⁶ .................................................. G06F 11/00
[52] U.S. Cl. ............... 371/5.1; 371/68.1; 395/185.09; 395/183.19
[58] Field of Search ................. 371/5.1, 35, 20.1, 371/20.4, 26, 28, 68.2, 67.1, 5.5; 395/185.09, 183.19; 379/1

[56] References Cited

U.S. PATENT DOCUMENTS 4,878,049 10/1989 Ochiai et al. ................... 371/5.5
5,099,480 3/1992 Murata ............................ 371/20.4
5,331,642 7/1994 Valley et al. ...................... 371/5.1
5,513,185 4/1996 Schmidt ........................... 371/5.1

*Primary Examiner*—Robert W. Beausoliel, Jr.
*Assistant Examiner*—Trinh L. Tu
*Attorney, Agent, or Firm*—Paul W. Martin

[57] ABSTRACT

A method for handling failures in an electronic price label (EPL) system which automatically diagnoses failures, and which may additionally automatically contact a support organization. The method includes the steps of transmitting a status request to a communications base station (CBS) and to an EPL by a computer, receiving a status reply from the CBS and the EPL by the computer, comparing the status message to fault data within a fault data file stored within a storage medium by the computer, and determining from the comparison whether a fault in the system has occurred.

3 Claims, 4 Drawing Sheets

FIG. 4

| Test | Purpose | Method |
|---|---|---|
| Port test | Test ports 31a-b | Perform loop test on ports 31a-b |
| CBS test | Test CBSs 15a-d | Query CBSs 15a-d and obtain return signals |
| CBS transmit test | Test CBS circuitry 39 and CBS transmit antenna 37 | Query CBSs 15a-d for transmitted signal level |
| CBS receive test | Test CBS circuitry 39 and CBS receive antennas 38 | Query CBSs 15a-d for connectivity and LNA 45 power consumption |
| EPL battery level test | Test EPL battery voltage | Query EPLs 18 for battery level |
| EPL sumcheck test | Test displayed EPL price and/or information | Compare EPL display price with EPL checksum stored in EPL data file 28 |
| EPL LCD glass test | Test display glass 49 | Query EPL circuitry 48 for LCD status |
| EPL in store and working test | Determine whether computer 12 can communicate with EPLs 18 and whether EPLs 18 are operating | Interrogate EPLs 18 and obtain return signal |
| EPL circuitry test | Test EPL circuitry 48 | Query EPL circuitry 48 and obtain return signal |
| Power supply test cable test | Test power supplies 16a, 16b, and cable 35a-c (assuming no alternate master CBS in this bank of CBSs) | Determine failure of CBSs 15a-d and compare to EPL system configuration file 27 to determine failure of either power supply 16a-b or cable 35a-c |
| First cable test | Test integrity of cable 33a | Determine failure of CBS 15a, use alternate master CBS 15c to determine whether communication with CBS 15a is possible |
| Cable high error rate test | Test integrity of cables 35a-c | Query CBS data 41 from CBSs 15a-d, determine whether any of files 41 contains excessively high error rates |
| EPL system configuration test | Test CBSs 15a-d for bad store location (which may occur if shelves are moved) | Monitor rate of false postives within CBS data 41, determine whether false positive rate is excessive |

FIG. 5

| Monitored Fault | Monitoring Action | Reported Recommendation |
|---|---|---|
| EPL battery voltage low | Perform EPL battery level test | Replace battery or EPL if level is too low |
| EPL display faulty | Perform EPL LCD glass test | Replace EPL |
| EPL circuitry faulty | Perform EPL circuitry test | Replace EPL |
| EPL not working or not in store | Perform EPL in store and working test | Replace EPL |
| All CBSs failure | Perform port test, CBS test, and power supply cable test, and first cable test | Replace port if port failure, replace CBS if CBS failure, replace power supply if power supply failure, replace cable 33a if cable 33a failure, replace cable 31a if port 31a failure |
| Single CBS failure | Perform CBS test | Replace CBS |
| Group of CBSs failure | Perform power supply test/ cable test, high error test, and CBS test | Replace power supply if power supply failure, replace cable 35b if cable 35b failure, replace CBS if one or more CBSs failure, replace cables 35a-c if one or more of cables 35a-c failure |
| CBS transmit antenna failure | Perform CBS transmit test | Replace CBS transmit antenna first, then CBS if necessary |
| CBS receive antenna failure | Perform CBS receive test | Replace CBS receive antenna first, then CBS if necessary |
| High retry error rates | Perform cable high error rate test | Replace one or more of cables 35a-c |
| Checksum filename | Compare EPL checksum with calculated checksum | Initiate price change |

METHOD FOR DETECTING AND REPORTING FAILURES IN EPL SYSTEMS

BACKGROUND OF THE INVENTION

The present invention relates to electronic price label (EPL) systems, and more specifically to a method for detecting and reporting failures in EPL systems.

EPL systems typically include a plurality of EPLs for each merchandise item in a store. EPLs typically display the price of corresponding merchandise items on store shelves and are typically attached to a rail along the leading edge of the shelves. A store may contain thousands of EPLs to display the prices of the merchandise items. The EPLs are coupled to a central server from where information about the EPLs is typically maintained in an EPL data file. Price information displayed by the EPLs is obtained from the PLU file.

Component failures in today's EPL systems are often diagnosed by service technicians. The technicians go to the sight of the failure and load and execute diagnostic software, which alerts the technicians of possible causes for the failures. The technicians must then order parts. This method of diagnosing EPL systems is time-consuming and costly. All price changes will have to be stopped during the down time.

Therefore, it would be desirable to provide a system and method for monitoring for EPL failures and for alerting service technicians of possible causes for the failures so that they can bring replacement parts with them to the sight to reduce recovery time and shorten down time.

SUMMARY OF THE INVENTION

In accordance with the teachings of the present invention, a method for detecting and reporting failures in EPL systems are provided. The method includes the steps of transmitting a status request to a communications base station (CBS) and to an EPL by a computer, receiving a status reply from the CBS and the EPL by the computer, comparing the status message to fault data within a fault data file stored within a storage medium by the computer, and determining from the comparison whether a fault in the system has occurred.

The method may also automatically contact a support organization with the diagnosed failure and a recommendation.

It is accordingly an object of the present invention to provide a method for detecting and reporting failures in EPL systems.

It is another object of the present invention to provide a method for detecting and reporting failures in systems which constantly monitors the EPL system for failures.

It is another object of the present invention to provide a method for detecting and reporting failures in EPL systems which suggests causes for the failures.

It is another object of the present invention to provide a method for detecting and reporting failures in EPL systems which automatically alerts service personnel to possible causes for the failures.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 4 is a chart of tests performed, purpose of tests, and methods of detection; and FIG. 5 is a chart of faults monitored, actions, and recommendations.

DETAILED DESCRIPTION OF THE PREFERRED EMBODIMENT

Figure 1:
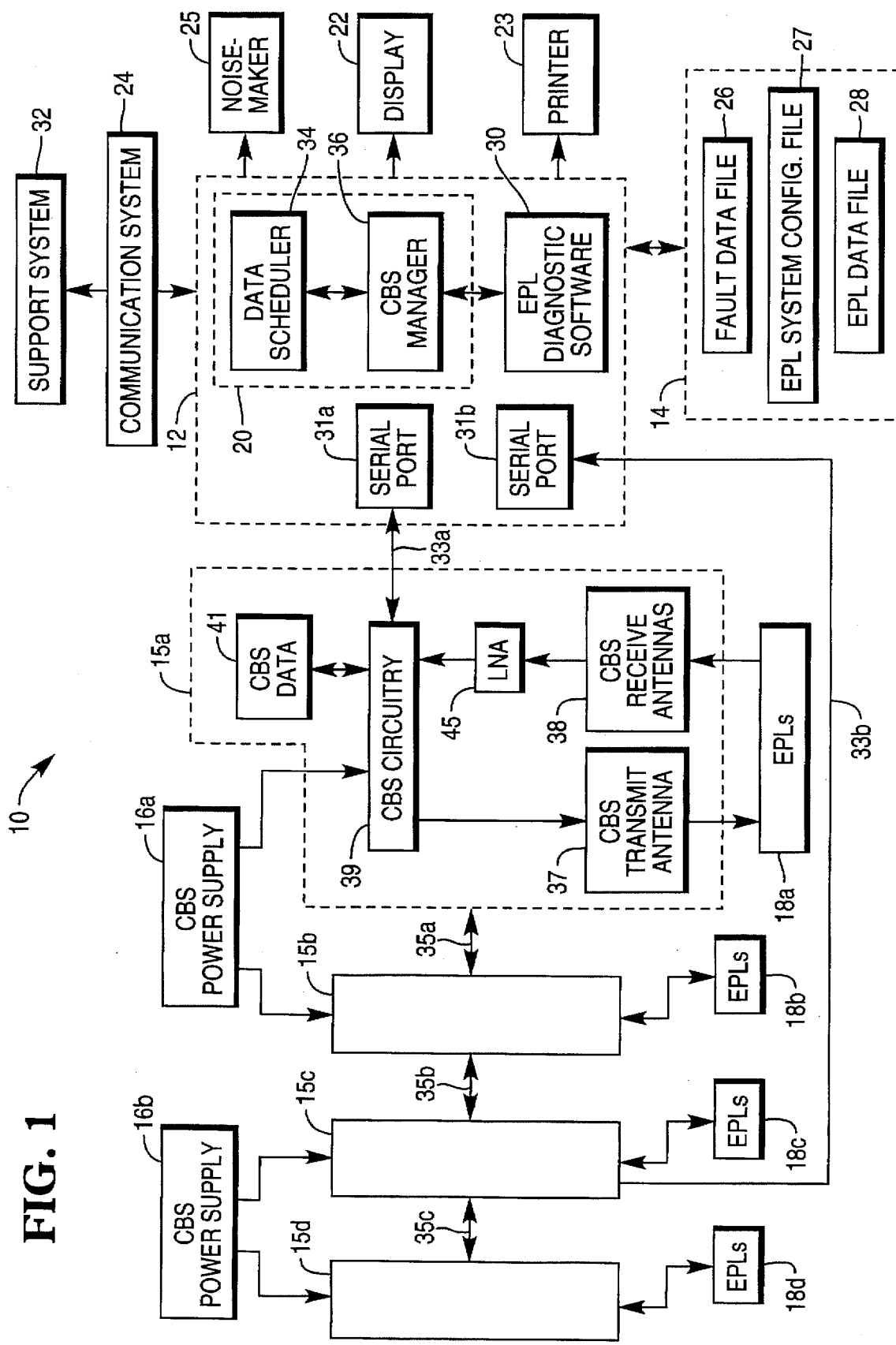
FIG. 1 is a block diagram of an EPL system.

Referring now to FIG. 1, EPL system 10 includes computer 12, storage medium 14, communication base stations (CBSs) 15a–d, CBS power supply 16a–b, electronic price labels (EPLs) 18a–d, display 22, printer 23, communications circuitry 24, and noisemaker 25.

Computer 12 executes EPL control software 20 and EPL diagnostic software 30. EPL control software 20 records, schedules, and transmits price changes to EPLs 18a–d through CBSs 15a–d, and receives and analyzes status messages from EPLs 18a–d through CBSs 15a–d. EPL control software 20 also maintains and uses EPL data file 28, which contains item information, identification information, item price verifier information, and status information for each of EPLs 18a–d. Computer 12 may include one or more communication ports 31a–b.

Storage medium 14 is preferably a fixed disk drive. Storage medium 14 stores fault data file 26, EPL system configuration file 27, and EPL data file 28. EPL system configuration file tells computer 12 how system 10 is configured, i.e., the addresses of EPL system components and there location relative to other components within system 10.

CBSs 15a–d are connected together in series by cables 35a–c. Here, only four CBSs are shown. CBSs 15a–d each include one transmit antenna 37 and up to four receive antennas 38 for transmitting and receiving messages between CBSs 15a–d and EPLs 18a–d. One or more of CBSs may receive power from a single power supply. Here, CBSs 15a–b receive power from CBS power supply 16a, and CBSs 15c–d receive power from CBS power supply 16b.

CBSs 15a–d each include CBS circuitry 39 which controls operation of each CBS. In CBSs 15a–d, circuitry 39 maintains memory-based CBS data 41. Within CBSs 15b–d, CBS data 41 contains error rates of communication between CBS 15a and each of the other CBSs 15b–d. Within CBS 15a, CBS data 41 contains error rates of communication between CBS 15a and computer 12. When CBS 15c is designated a master as explained below, CBS data 41 contains error rates of communication between CBS 15c and computer 12. Excessively high error rates can signal a bad connection in cables 33a–b, or cables 35a–c.

CBSs 15a–d also include a low-noise amplifier (LNA) 45 which amplifies signals receive by CBS receive antennas 38 so that CBS circuitry 39 can better process the information within those signals.

One cause of CBS failure is a failure of LNA 45. To determine whether LNA 45 is faulty (failed or not connected), computer 12 transmits a status message to CBS 15a, CBS 15a transmits the status message to EPL 18a, and EPL 18a transmits a return signal to CBS 15a. If the return signal is not received by computer 12 through CBS 15a, computer 12 determines whether LNA 45 is consuming power above a predetermined minimum power level. If the power level is below the predetermined minimum power level, computer 12 transmits a fault message to support system 32.

The types of information logged within CBS data 41 include the number of messages sent to other CBSs and whether the other CBSs responded. CBS data 41 also keeps track of the number of messages sent to the EPLs and if it 'heard' anything of interest or not.

CBS 15a is a master CBS and CBSs 15b–d are slave CBSs. CBS 15a communicates directly with computer 12. An alternate master may also be designated. Here, CBS 15c is shown as an alternate master which communicates directly with computer 12 through cable 33b when CBS 15a is down (not working properly), its communication port 31a is down, or when cable 33a between CBS 15a and computer 12 is down.

EPL interface software 20 primarily includes data scheduler 34 and CBS manager 36. Data scheduler 34 schedules EPL price change messages to be sent to EPLs 18a–d through CBSs 15 and 16.

CBS manager 36 schedules the actual transmission of price change messages to EPLs 18a–d and the reception of status messages from EPLs 18a–d for predetermined time slots.

EPL diagnostic software 30 automatically monitors EPL system 10 for failures, logs failures in fault data file 26, displays failures on display 22, prints failure reports using printer 23, and reports failures and read faults that have been logged in fault data file 26 by other applications to support system 32 using communication circuitry 24.

Storage medium 14 contains fault data file 26 and EPL data file 28.

Communication circuitry 24 transmits failure messages generated by EPL diagnostic software 30 to support system 32. Communication circuitry 24 is preferably a modem, but could also include network circuitry, such as a local area network (LAN) or wide area network (WAN) adapter.

Support system 32 is preferably a computer system with a modem located at the site of an EPL system vendor or EPL system technician.

Noisemaker 25 alerts users of a failure. Noisemaker 25 is preferably coupled to computer 12.

Figure 2:
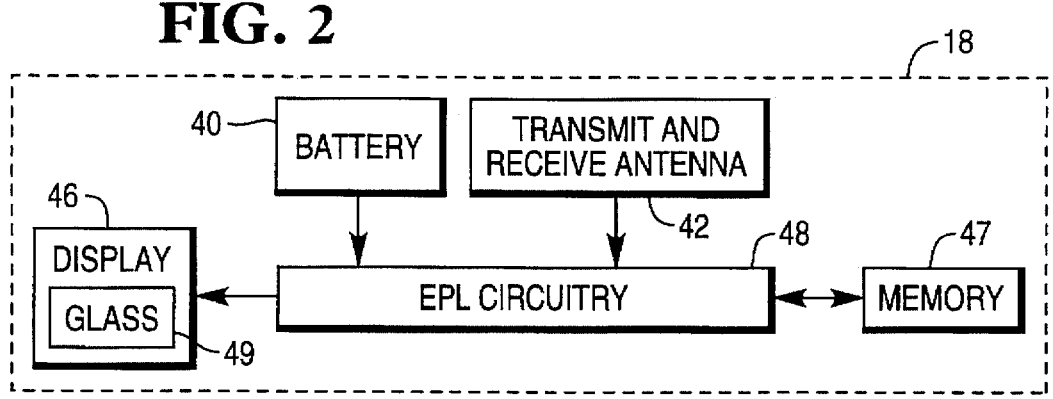
FIG. 2 is a block diagram of an EPL module.

Turning now to FIG. 2, EPLs 18a–d each include battery 40, transmit and receive antenna 42, display 46, memory 47, and EPL circuitry 48. Since there is only one antenna 42, if antenna 42 is broken, the EPL is considered broken or lost (not in the store).

Battery 40 provides power to EPLs 18a–d. A low battery voltage is one cause for EPL malfunction and failure.

Transmit and receive antenna 42 receives price change and status messages from CBS 15a–d. Failure of antenna 42 can cause EPL 18a–d to miss price change requests from EPL control software 20.

Transmit and receive antenna 42 transmits responses to price change and status messages to CBS 15a–d. Failure of antenna 42 can prevent EPL control software 20 from verifying that price changes have been received and displayed by EPL 18a–d.

Display 46 displays price and possibly additional information. Display 46 is preferably a liquid crystal display and includes glass 49. A failure of display 46, which may include a crack in glass 49, prevents EPL 18a–d from displaying price information to customers.

Memory 47 stores price verifier information. Preferably, the price verifier information is a checksum of the displayed price.

EPL circuitry 48 controls the internal operation of EPL 18a–d. A failure within circuitry 48 can cause a total failure of EPL 18a–d.

Figure 3:
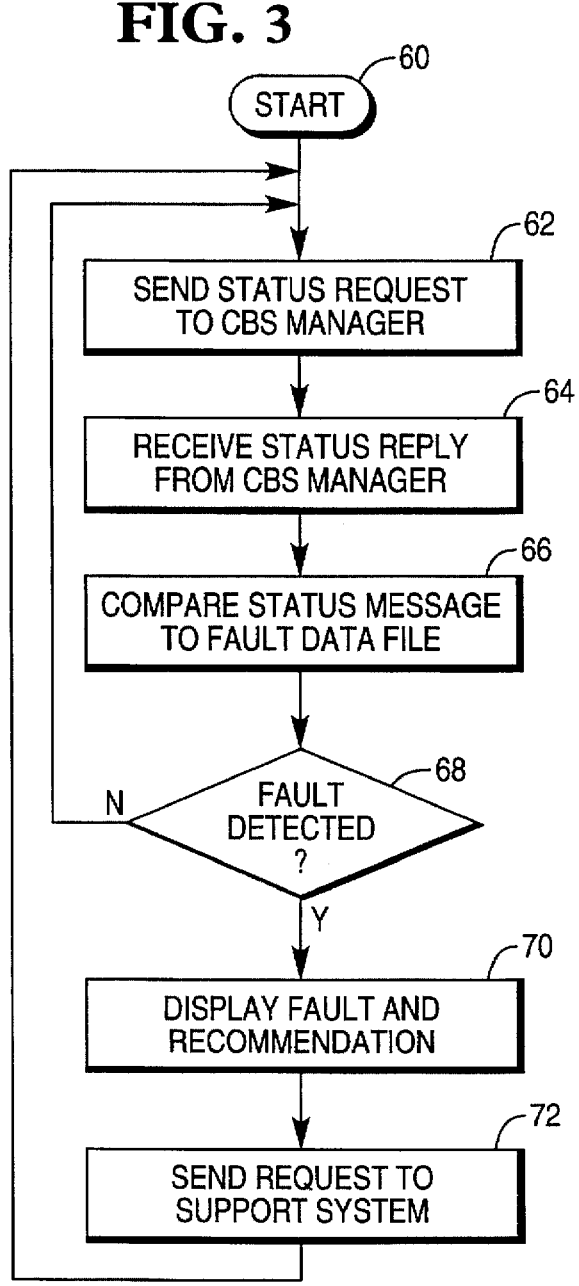
FIG. 3 is a flow diagram illustrating the failure detection and reporting method of the present invention.

Turning now to FIG. 3, the operation of EPL diagnostic software 30 is explained in more detail, beginning with START 60.

In step 62, EPL diagnostic software 30 periodically sends an instruction to CBS manager 36 to transmit a status request to CBSs 15a–d and EPLs 18a–d.

In step 64, EPL diagnostic software 30 receives a status reply from CBS manager 36.

In step 66, EPL diagnostic software 30 compares the status message to fault data file 26 and configuration file 27.

In step 68, EPL diagnostic software 30 determines from the comparison whether a fault has occurred. If not, then the method returns to step 62.

If a fault has been detected, EPL diagnostic software 30 displays the fault condition and a recommendation on display 22. Alternatively, EPL diagnostic software may activate noisemaker 25 or cause a printer to print an error message in step 70.

In step 72, EPL diagnostic software 30 notifies store personnel and support system 32 of the problem and sends a support request containing the fault condition and recommendation to support system 32. Notification of support system 32 and store personnel could be in the form of a displayed, printed, or aural message. Preferably, display 22 is used to notify store personnel. The method then returns to step 62 to continue monitoring EPL system 10.

Advantageously, EPL diagnostic software 30 provides immediate and automatic notification of critical component failure to store personnel and to EPL technicians. Notification of non-critical components failure may be delayed.

EPL diagnostic software 30 performs tests which are listed in FIG. 4.

Examples of failures that are monitored and reported by EPL diagnostic software 30 are shown in FIG. 5.

When a fault occurs, the fault may be determined by implementing one or more tests. For example, if a CBS test on all of CBSs 15a–d indicates that all of CBSs 15a–d have failed, the failure may have been caused by any one of a plurality of causes, least probable of which are substantially simultaneous failures of CBSs 15a–d. A failure of serial port 31a is one possible cause, therefore, a port test is performed. If serial port 31a has failed, EPL diagnostic software 30 generates a support request which is sent to support system 32 by communication circuitry 24.

If serial port 31a has not failed, CBS 15a or cable 33a may have failed. A failure of either prevents messages from reaching CBSs 15b–d. To test this cause, CBS 15c is configured as the master CBS and a CBS test is performed on each CBS 15a–d. If CBS 15a passes the CBS test, then cable 33a is the likely cause of failure. EPL diagnostic software 30 generates a support request which is sent to support system 32 by communication circuitry 24.

If CBS 15a does not pass the test, and other CBSs also do not pass the test, a power supply test is performed to determine whether power supply 16a is the cause of the failure. If both CBS 15a and CBS 15b have failed, the power supply test compares the failure of CBSs 15a and 15b to EPL system configuration file 27. Since CBSs 15a and 15b are both powered by power supply 16a, a failure of power supply 16a is the likely cause. EPL diagnostic software 30 generates a support request which is sent to support system 32 by communication circuitry 24.

As another example of how the tests in FIG. 4 can be combined to diagnose faults in FIG. 5, suppose that EPL diagnostic software 30 queries EPLs 18a–d and provides a preliminary indication that one or more of EPLs 18a–d are not working or not in system 10. If only one EPL is down, then the EPL is down or the EPL is not listed in EPL data file 28.

If a plurality of EPLs 18a–d are down, then one of CBSs 15a–d is probably down since it is not probable that a plurality of EPLs 18a–d would fail substantially simultaneously. A CBS test is performed on the CBS associated with the down EPLs. If the CBS is down, EPL diagnostic software 30 generates a support request which is sent to support system 32 by communication circuitry 24.

If the CBS is not down, then only part of the CBS may be down. The transmitter portion of CBS circuitry 39 may be the likely cause. Therefore, a CBS transmit test is performed. If the CBS cannot transmit to its associated EPLs, then EPL diagnostic software 30 generates a support request which is sent to support system 32 by communication circuitry 24.

Although the present invention has been described with particular reference to certain preferred embodiments thereof, variations and modifications of the present invention can be effected within the spirit and scope of the following claims.

What is claimed is:

1. A method for determining whether any of a plurality of cables serially connecting a plurality of communication base stations to a master communication base station within an electronic price label (EPL) system has failed comprising the steps of:

monitoring transmit and receive errors by each of the communication base stations during transmission of wireless messages to EPLs and reception of wireless messages from the EPLs;

saving first error rate information by each of the communication base stations;

transmitting a message to each of the communication base stations through the cables for requesting the first error rate information by a computer coupled to the master communication base station;

returning the first error rate information to the computer by the communication base stations through the cables;

determining a maximum error rate for each communication base station by the computer;

transmitting a subsequent message to each of the communication base stations through the cables for requesting second error rate information including second error rates by the computer;

returning the second error rate information to the computer by the communication base stations through the cables;

comparing the second error rate information for each communication base station with its predetermined maximum error rate; and if any of the second error rates exceeds the corresponding maximum error rate for the communication base station, transmitting a fault message indicating that one of the cables coupled to the communication base station having an excessive error rate is faulty to an EPL system support organization.

2. A method for determining whether any of a plurality of cables connecting a plurality of communication base stations to a computer within an electronic price label (EPL) system has failed comprising the steps of:

monitoring transmit and receive errors by each of the communication base stations during transmission of wireless messages to EPLs and reception of wireless messages from the EPLs;

saving first error rate information by each of the communication base stations;

transmitting a message to each of the communication base stations through the cables for requesting the first error rate information by the computer;

returning the first error rate information to the computer by the communication base stations through the cables;

determining a maximum error rate for each communication base station by the computer;

transmitting a subsequent message to each of the communication base stations through the cables for requesting second error rate information including second error rates by the computer;

returning the second error rate information to the computer by the communication base stations through the cables;

comparing the second error rate information for each communication base station with its predetermined maximum error rate; and if any of the second error rates exceeds the corresponding maximum error rate for the communication base station, transmitting a fault message indicating that one of the cables coupled to the communication base station having an excessive error rate is faulty to an EPL system support organization.

3. A method for determining whether any of a plurality of cables connecting a plurality of communication base stations to a computer within an electronic price label (EPL) system including EPLs has failed comprising the steps of:

monitoring transmit errors during transmission of first messages from the computer to the EPLs, wherein the first messages are sent from the computer to the communication base stations through the cables, and wherein the first messages are sent wirelessly from the communication base stations to the EPLs;

monitoring receive errors during reception of messages received from the EPLs in reply to the first messages, wherein the received messages are wirelessly transmitted by the EPLs to the communication base stations, and wherein the received messages are sent through the cables to the computer;

saving first error rate information for each of the communication base stations;

determining a maximum error rate for each communication base station by the computer;

monitoring transmit errors during transmission of second messages from the computer to the EPLs, wherein the second messages are sent from the computer to the communication base stations through the cables, and wherein the second messages are sent wirelessly from the communication base stations to the EPLs;

monitoring receive errors during reception of messages received from the EPLs in reply to the second messages, wherein the received messages are wirelessly transmitted by the EPLs to the communication base stations, and wherein the received messages are sent through the cables to the computer;

determining second error rate information including second error rates for each communication base station;

comparing the second error rate for each communication base station with its predetermined maximum error rate; and if any of the second error rates exceeds the corresponding maximum error rate for the communication base station, transmitting a fault message by the computer indicating that one of the cables coupled to the communication base station having an excessive error rate is faulty to an EPL system support organization.

* * * * *